United States Patent Office 3,449,133
Patented June 10, 1969

3,449,133
GLYCERIDE FAT TABLETS CONTAINING FRYING FAT ADDITIVES
Robert D. Dobson, Greenhills, Louis H. Going, Deerfield Township, Warren County, and Eddy R. Hair, Colerain Township, Hamilton County, Ohio, assignors to The Procter & Gamble Company, Cincinnati, Ohio, a corporation of Ohio
No Drawing. Filed Nov. 16, 1966, Ser. No. 594,702
Int. Cl. A23d 5/04; C11b 5/00
U.S. Cl. 99—163        6 Claims

ABSTRACT OF THE DISCLOSURE

A predominately beta phase tending substantially completely hydrogenated triglyceride fat having an iodine value of about 8 with up to about 50% by weight methyl silicone and beta carotene is internally aerated and slowly crystallized directly into beta phase in the size and shape of tablets, having a density of less than about 0.80 g./cc.

---

This invention relates to aerated hard triglyceride fat compositions having a predominantly beta phase crystalline structure and containing additives for addition to deep frying fats. More particularly, this invention relates to a method for preparing predominantly beta phase triglyceride compositions in tablet form containing materials which prolong the frying life and improve the frying performance of deep frying fats. The additives in the hard triglyceride fat tablets include methyl silicone, beta carotene, and the like. These materials are uniformly admixed with a hot, melted and aerated beta phase-tending triglyceride fat vehcile which is molded and hardened into small tablets designed for convenient periodic addition to frying fats.

French fried potatoes; fried scallops, oysters and chicken; fried onion rings and similar foods are deep fat fried in kettles or specially designed frying equipment which contain large quantities of hot, melted triglyceride fat relative to the weight of the food immersed in the fat during the cooking operation. Only a small amount of fat is absorbed by the food during frying so that there is little, if any, attrition of the fat. The fat can be used repeatedly; its useful frying life is limited only by the oxidative instability of the fat at high temperatures. When deep frying fats begin to oxidize or break down, they darken in color, thicken, and develop surface foam. The oxidized fat imparts an off-flavor to the fried food and the dark color of the fat tends to carry over to the food. The volume of foam can become so great that it runs out of the fry kettle and makes continued use of the fat impractical. Oxidized fat must be discarded and replaced by a fresh supply of deep frying fat.

Martin, U.S. Patent 2,634,213, granted April 7, 1953, teaches the addition of small amounts of methyl silicone to deep frying fats to increase their oxidative stability at high temperatures and prolong their frying life. Fats designed expressly for frying ordinarily contain methyl silicone in amounts which range up to about 2.0 p.p.m. These fats are reasonably stable against oxidative deterioration; they have a fry life of from about one to about five days under repeated use conditions when the temperature of the fat is maintained at about 350° F. There are many other so-called "all-purpose" fat and oil products which are not designed solely for frying purposes; these products oridnarily contain little or no methyl silicone. It is not practical to incorporate more than about 0.8 p.p.m. of methyl silicone in an "all-purpose" product because greater amounts of methyl silicone tend to have a detrimental effect on the baking performance of these products. A small but significant portion of all-purpose fat and oil products is used for deep fat frying. Lard and winter oils which ordinarily contain no methyl silicone are also used for deep fat frying. The absence of methyl silicone in these products makes them even more oxidatively unstable at the high temperatures which are employed in deep fat frying then the all-purpose products.

Carotene, particularly beta carotene, is a natural yellow pigment. It is easily isolated and concentrated from carrots and certain other vegetable sources. Beta carotene is commonly used to fortify the natural color of certain fat and oil products; for example, it is used to color margarine and shortening. Food which is fried in a fat or oil containing beta carotene tends to have a rich golden yellow color that is achieved by assimilating a small amount of beta carotene from the frying fat. Beta carotene, however, is not heat stable and it tends to deteriorate after prolonged exposure to the high temperatures which are used for deep fat frying foods. The value of adding beta carotene to frying fats is short lived and only the foods fried in fresh fat derive any real benefit from the presence of beta carotene.

There is no reasonable limit of the amount of methyl silicone which can be added to fats and oils designed especially for deep fat frying; however, as a practical matter it is not useful to add more than about 2.0 p.p.m. because amounts in excess of about 2.0 p.p.m. cannot overcome the natural tendency of the fat to darken with use. There is, however, a very real limit on the amount of beta carotene which can be incorporated into a deep frying fat. An excessive amount of beta carotene discolors the food fried in the fat and gives the food a very noticeable and artificial yellow color. Since the amount of beta carotene in a frying fat tends to be depleted by use, it would be most desirable to have a means for periodically adjusting the level of beta carotene in deep frying fats to maintain a natural golden color in the fried foods. Beta carotene will char; therefore, in adding beta carotene, it cannot be exposed in highly concentrated amounts to the heating elements which ordinarily surround the sides and bottom of deep fat fryers. It would also be desirable to have a means for adding methyl silicone to frying fats which contain no methyl silicone or insffiucient amounts of methyl silicone to make them stable against oxidation at high temperatures.

Accordingly, it is a principal object of this invention to provide a convenient means for introducing additives to deep frying fats at periodic intervals during the frying cycle. It is another object of this invention to provide a method for preparing hard aerated fatty triglyceride compositions in tablet form containing methyl silicone, beta carotene and like additives.

These and other objects and features of this invention will be apparent from the following detailed description of the invention.

Briefly stated, this invention comprises producing hard aerated fatty triglyceride tablets which float until dissolved on or near the surface of a hot liquid triglyceride deep frying fat and release by virtue of melting into the hot liquid triglyceride frying fat certain additives; namely, methyl silicone, beta carotene and the like. The hard fatty triglyceride tablets are produced by homogeneously mixing the additives with a melted, internally aerated, predominantly beta phase-tending, substantially completely hydrogenated triglyceride fat having an iodine value of about 8, and by slowly crystallizing the fat above its beta prime melting point directly into the beta phase. The beta phase crystallizing is carried out in shaped cavities having substantially the size and shape of the final tablets.

The polymorphic crystalline structures of solid triglyceride fats are identified by their X-ray diffraction patterns in the manner described in Mitchell, U.S. Patents 2,521,241 and 2,521,242, granted Sept. 5, 1950. Most triglyceride fats can be crystallized in more than one form; the form of the crystals generally depends upon the processing of the fat.

The substantially completely hydrogenated triglyceride fat having an iodine value of about 8 (hardstock) which is used in the tablets of the present invention must be capable of crystallizing predominantly in the beta phase. In other words, the solid triglycerides and partial glycerides in the hardstock must be at least 80% in the beta phase as opposed to the alpha or beta prime phases. Substantially completely hydrogenated triglyceride hardstocks having strong beta phase-forming tendencies include tristearin, tripalmitin, and symmetrical palmitodistearin. Other suitable hardstocks which have strong beta phase-forming tendencies can be derived from substantially completely hydrogenated fats and oils such as lard, sunflower seed oil, safflower seed oil, linseed oil, sesame seed oil, hazelnut oil, soybean oil, peanut oil, olive oil, and corn oil. The preferred beta phase-tending hardstock component for use in this invention is substantially completely hydrogenated soybean oil having an iodine value of about 8.

An essential feature of this invention is the use of beta phase-tending hardstock; in this invention, it has two distinct advantages over hardstocks which do not crystallize predominantly in the beta phase. All hardstocks contain air in solution and in beta prime-tending hardstocks the air remains in solution when the hardstock is crystallized. As a consequence it is not possible to produce buoyant tablets of the type required in this invention from beta prime-tending hardstocks. On the other hand, beta phase-tending hardstocks can be crystallized in a manner which will produce buoyant tablets capable of floating on or near the surface of deep frying fats until the tablets have melted. The mechanism by which the buoyancy is created is not fully understood; however, it is believed that when a beta phase-tending hardstock crystallizes, air is forced out of solution and it forms small bubbles. It is also possible that the crystal structure inherently forms vacuoles which reduce the density of the hardstock and create buoyancy. Regardless of the mechanism, an expansion of the hardstock (sometimes referred to as "bloom") takes place when the hardstock cools. In addition to reducing the density of the tablets, the hardstock expands to completely fill the tablet molds. Beta prime-tending hardstocks have a tendency to shrink when they crystallize; they are, therefore, difficult, if not impossible, to cast into uniformly sized and shaped tablets.

The hardstocks from which the tablets are molded can include up to about 35% by weight of substantially completely hydrogenated triglyceride fat having an iodine value of about 8 which does not have strong beta phase tendencies without materially detracting from the buoyancy characteristics of the beta phase-tending tablets. For example, cottonseed oil and rapeseed oil hardstock can be admixed with the beta phase-tending hardstock to produce tablets having better molding or casting properties and better surface characteristics than those obtained with tablets composed entirely of beta-tending hardstocks. The tendency of beta prime-tending hardstocks to shrink when they crystallize improves the mold release characteristics of the beta phase-tending tablets which in turn substantially reduces or eliminates the fracture or cracking of the tablet surfaces. The fatty triglyceride portion of a preferred tablet is composed of 75% by weight substantially completely hydrogenated soybean oil having an iodine value of about 8 and 25% by weight substantially completely hydrogenated cottonseed oil having an iodine value of about 8.

The methyl silicone and beta carotene additives which are incorporated in the tablets of this invention are well known materials; any reliable and readily available commercial source of these materials can be relied upon in practicing this invention. These additives can comprise up to about 50% by weight of each tablet; the amount of additives incorporated in each tablet is a matter of choice which is generally determined by the size of the tablets and the frequency of their intended use. A six-gram tablet intended for addition about once every four hours to 15 pounds of fat in which four batches of french fries are deep fat fried every hour should contain from about 3.0% to about 4.0% by weight beta carotene and from about 0.01% to about 0.1% by weight methyl silicone.

The preferred method of forming the hard aerated fatty triglyceride tablets of this invention comprises forming a completely melted mixture of the substantially completely hydrogenated hardstock and additives in a vessel heated to a temperature in excess of about 140° F. The temperature, of course, varies slightly depending upon the melting point of the particular hardstock or hardstock mixtures which are used. The vessel is preferably equipped with a propeller-type agitator designed and positioned for the most effective aeration of the mixture. Mechanical aeration may not be required if there is sufficient air in solution in the melted hardstock to produce a self-aerated and buoyant tablet of reduced density. The agitator can be used to whip any desired or necessary amount of air into the melted mixture. The completely melted and preferably mechanically aerated mixture is pumped or gravity fed from the vessel directly into individual molds, the temperatures of which are about 140° F. The molds are filled and placed in a tempering room or box maintained at about 120° F. to about 140° F. for a period of about ten hours. The transformation of the crystalline solids to beta phase takes place in the molds while they are at rest in the tempering room. The molds are removed from the tempering room and cooled by blowing air or other cooling medium over them. The tablets are removed from the cooled molds and packed for storage or shipment. Tablets which are prepared from predominantly beta phase-tending hardstocks in the above manner will have an interlaced structure of very small particles which are predominantly (greater than about 80%) in the beta crystalline phase.

The following examples clearly illustrate the compositions of this invention; the invention, however, is not limited to these examples. Unless otherwise indicated, all parts are by weight.

Four batches of small tablets were prepared in the manner described below from four individual mixtures of the following ingredients:

| | Lbs. |
|---|---|
| Substantially completely hydrogenated soybean oil having an iodine value of 8 | 96.637 |
| Beta carotene (24% cottonseed oil solution) | 3.334 |
| Methyl silicone (Dow 200C) | 0.029 |

In each instance the uniformly admixed ingredients were heated in a stainless steel tank to 160° F. to completely melt the substantially completely hydrogenated soybean oil hardstock.

One batch of tablets was prepared by metering the melted mixture into open tablet molds (held at a temperature of 90° F.) designed to produce tablets having an average weight of six grams. The filled molds were immediately cooled after filling in approximately five minutes by passing 90° F. air at about 1000 linear feet per minute past the molds. The tablets were then removed from the molds and randomly placed in cartons. The crystals in the tablets were not in a beta phase; the hardstock was not processed in the manner required to obtain tablets having a beta phase crystalline structure.

The tanks containing the three remaining mixtures were each equipped with a three-speed propeller-type Lightning mixer. Each mixture was stirred in the "slight," "moderate" or "vigorous" manner noted below in the table to produce tablets having the indicated average final densities. When each mixture had been aerated in the manner indicated, the melted mixture was poured into open tablet molds which had been heated to 140° F.; the filled and open tablet molds were maintained at this temperature in a tempering room for 10 hours during which time beta phase crystals were formed. The tablets were cooled to room temperature by passing 90° F. air at 1000 linear feet per minute past the molds. The tablets were removed from the cooled molds whose cavity shape and size they had assumed, and packed into cartons. X-ray analysis of the tablets showed that the crystalline particles in the tablets were about 100% in the beta phase.

Substantially similar tablets can be made in the same manner using a fatty triglyceride mixture which is 75% by weight substantially completely hydrogenated soybean oil having an iodine value of about 8 and 25% by weight substantially completely hydrogenated cottonseed oil having an iodine value of 8.

TABLE

| | | | | |
|---|---|---|---|---|
| Air incorporation | None | Slight | Moderate | Vigorous. |
| Average tablet density, g./cc | | .89 | .80 | .71. |
| Tablet, shape | Cylindrical | Cylindrical | Cylindrical | Cylindrical. |
| Average tablet wt., g | About 6 | About 6 | About 5 | About 5. |
| Crystalline particles | No beta phase | Beta phase | Beta phase | Beta phase. |
| Action in 350° F. deep frying fat | Sinks | Sinks | Floats under surface | Floats at surface. |
| Average dissolving time, min | 1¼–1½ | 1¼–1½ | About ¾ | About ¾. |

The preceding table shows that aerated beta phase tablets having an average density of less than about .80 g./cc. will float on or near the surface of hot deep frying oil until they are fully dissolved. It also illustrates the necessity for correctly processing the beta phase-tending hardstock to obtain tablets having a beta phase crystalline structure in order to obtain tablets which will float on or near the surface of the hot oil. It is not possible to obtain self-aerated or mechanical aerated molded or cast tablets of the type desired unless the hardstock materials comprising the tablets are processed in the manner required to produce crystals which are predominantly in the beta phase. A tablet containing beta prime crystals and having a density lower than about 0.9 g./cc. is difficult to obtain. The surfaces of the beta phase tablets of the table were completely satisfactory and were not cracked or mottled.

Tablets containing the same average amounts of methyl silicone and beta carotene as the above-described compositions and prepared in the same manner from beta phase-tending triglyceride fats can be evaluated in controlled frying studies to determine their effectiveness in prolonging the frying life of typical fat products and to demonstrate the effect they have on the color of foods fried in these fats. In a typical test 15 pounds of frying fat is placed in the deep fat fryer and heated to 380° F. Twice a day, say, at 9 a.m. and 2 p.m. one pound of french cut potatoes, one pound of scallops, and one pound of breaded onions is fried separately in each fat for a period of three minutes. The kettles are operated in this manner 24 hours per day until foamover occurs. The extended frying life of fats to which six six-gram tablets are added between each frying cycle is about two to three fold. This increase in frying life is determined by the increased number of hours it takes for foam to appear on the surface of a frying fat to which the tablets have been added and by the increased useful frying time which is obtained before foamover occurs. Food products fried in frying fats to which beta carotene-containing tablets have been added between each frying cycle are demonstrably more golden in color than those products fried in plain fats. The difference in color is most notable at or near the end of the frying life of each fat.

What is claimed is:

1. A hard aerated fatty triglyceride tablet which floats until dissolved on or near the surface of a hot liquid triglyceride deep frying fat and releases by virtue of melting into the hot liquid triglyceride methyl silicone and beta carotene comprising a molded, internally aerated, predominantly beta phase-tending substantially completely hydrogenated triglyceride fat having an iodine value about 8 containing from about 0.01% to about 0.1% by weight methyl silicone and from about 3.0% to about 4.0% by weight beta carotene, said tablet having a density of less than about .80 g./cc.

2. The hard aerated fatty triglyceride tablet of claim 1 in which the fatty triglyceride is 75% by weight substantially completely hydrogenated soybean oil having an iodine value of about 8 and 25% by weight substantially completely hydrogenated cottonseed oil having an iodine value of about 8.

3. A method of producing hard aerated fatty triglyceride tablets which float until dissolved on or near the surface of a hot liquid triglyceride deep frying fat and releases by virtue of melting into the hot liquid triglyceride methyl silicone and beta carotene which comprises homogeneously mixing a melted, predominantly beta phase-tending substantially completely hydrogenated triglyceride fat having an iodine value of about 8 with about 0.01% to about 0.1% by weight methyl silicone and from about 3.0% to about 4.0% by weight beta carotene, internally aerating the resulting mixture, and slowly crystallizing the fat above its beta prime melting point directly into beta phase in shaped cavities having substantially the size and shape of the final tablets said tablets having a density of less than about .80 g./cc.

4. The method of claim 3 wherein the melted, predominantly beta phase-tending substantially completely hydrogenated triglyceride fat is mechanically aerated.

5. The method of claim 3 wherein the homogeneous mixture of melted, internally aerated, predominantly beta phase-tending substantially completely hydrogenated triglyceride fat, methyl silicone and beta carotene is poured into molds the temperatures of which are about 140° F. and the filled molds tempered at about 120° F. to about 140° F. for a period of about 10 hours during which time the solids in the crystallize in predominantly the beta phase.

6. The method of claim 3 wherein the predominantly beta phase-tending substantially completely hydrogenated triglyceride fat is mixed with less than about 35% by weight substantially completely hydrogenated triglyceride fat having an iodine value of about 8 which does not have strong beta phase tendencies.

References Cited

UNITED STATES PATENTS

| | | | |
|---|---|---|---|
| 1,890,585 | 12/1932 | Newton et al. | 99—163 X |
| 2,521,243 | 9/1950 | Mitchell | 99—118 X |
| 2,634,213 | 4/1953 | Martin | 99—163 |
| 2,951,262 | 9/1960 | Dorfman | 99—118 |
| 3,294,825 | 12/1966 | Pottier | 99—163 X |

MAURICE W. GREENSTEIN, *Primary Examiner.*

U.S. Cl. X.R.

99—100, 118